United States Patent
Garcia

(10) Patent No.: US 8,655,495 B2
(45) Date of Patent: Feb. 18, 2014

(54) CURRENT CONTROL OF A WIND PARK

(75) Inventor: Jorge Martinez Garcia, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 12/771,724

(22) Filed: Apr. 30, 2010

(65) Prior Publication Data

US 2010/0332040 A1 Dec. 30, 2010

Related U.S. Application Data

(60) Provisional application No. 61/222,134, filed on Jul. 1, 2009.

(30) Foreign Application Priority Data

Jun. 24, 2009 (DK) .................................. 2009 00781

(51) Int. Cl.
*G06F 19/00* (2011.01)
*H02P 9/04* (2006.01)

(52) U.S. Cl.
USPC ............................................. 700/287; 290/44

(58) Field of Classification Search
USPC ............ 700/286, 297, 292, 293, 287; 290/44, 290/55
See application file for complete search history.

(56) References Cited

U.S. PATENT DOCUMENTS

| | | | | |
|---|---|---|---|---|
| 5,187,427 A | * | 2/1993 | Erdman | 323/207 |
| 5,225,712 A | * | 7/1993 | Erdman | 290/44 |
| 6,670,721 B2 | * | 12/2003 | Lof et al. | 290/44 |
| 6,693,409 B2 | * | 2/2004 | Lynch et al. | 323/208 |
| 6,840,734 B2 | * | 1/2005 | Hansen | 415/1 |
| 6,853,094 B2 | * | 2/2005 | Feddersen et al. | 290/44 |
| 6,924,565 B2 | * | 8/2005 | Wilkins et al. | 290/44 |
| 7,145,266 B2 | * | 12/2006 | Lynch et al. | 307/65 |
| 7,253,537 B2 | * | 8/2007 | Weng et al. | 290/44 |
| 7,332,827 B2 | * | 2/2008 | Nielsen | 290/55 |
| 7,372,174 B2 | * | 5/2008 | Jones et al. | 290/44 |
| 7,417,333 B2 | * | 8/2008 | Miller et al. | 290/44 |
| 7,508,173 B2 | * | 3/2009 | Zhou et al. | 323/207 |
| 7,511,385 B2 | * | 3/2009 | Jones et al. | 290/44 |
| 7,514,907 B2 | * | 4/2009 | Rajda et al. | 323/205 |

(Continued)

FOREIGN PATENT DOCUMENTS

EP 1841036 A2 10/2007

OTHER PUBLICATIONS

Danish Patent and Trademark Office, Search Report issued in related Danish Patent Application No. PA200900781 dated Jan. 26, 2010.

(Continued)

*Primary Examiner* — Charles Kasenge
(74) *Attorney, Agent, or Firm* — Patterson & Sheridan, LLP

(57) ABSTRACT

A method for controlling a current in a wind park is provided. The wind park includes at least one wind turbine and at least one current generator. The method includes detecting a grid irregularity, determining an optimal current to be provided at a predetermined location in the wind park during the grid irregularity and determining a corresponding current to be generated from the at least one current generator so as to provide the optimal current at the predetermined location. The corresponding current is determined based on at least an impedance value between the at least one current generator and the predetermined location.

18 Claims, 7 Drawing Sheets

(56) References Cited

U.S. PATENT DOCUMENTS

| | | | |
|---|---|---|---|
| 7,567,160 B2* | 7/2009 | Folts et al. | 336/55 |
| 7,605,487 B2* | 10/2009 | Barton et al. | 290/44 |
| 7,692,321 B2* | 4/2010 | Jones et al. | 290/44 |
| 7,755,209 B2* | 7/2010 | Jones et al. | 290/44 |
| 7,804,184 B2* | 9/2010 | Yuan et al. | 290/44 |
| 7,839,024 B2* | 11/2010 | Cardinal et al. | 307/84 |
| 8,189,353 B2* | 5/2012 | Letas | 363/39 |
| 2003/0035308 A1* | 2/2003 | Lynch et al. | 363/34 |
| 2004/0145357 A1* | 7/2004 | Lynch et al. | 323/208 |
| 2005/0040655 A1 | 2/2005 | Wilkins et al. | |
| 2006/0238929 A1* | 10/2006 | Nielsen | 361/20 |
| 2006/0267560 A1* | 11/2006 | Rajda et al. | 323/209 |
| 2007/0108771 A1* | 5/2007 | Jones et al. | 290/44 |
| 2007/0121354 A1* | 5/2007 | Jones et al. | 363/47 |
| 2007/0132248 A1* | 6/2007 | Weng et al. | 290/44 |
| 2007/0135970 A1* | 6/2007 | Zhou et al. | 700/286 |
| 2007/0273155 A1* | 11/2007 | Barton et al. | 290/44 |
| 2008/0106098 A1* | 5/2008 | Miller et al. | 290/44 |
| 2008/0296898 A1* | 12/2008 | Ichinose et al. | 290/44 |
| 2009/0204266 A1* | 8/2009 | Lovmand et al. | 700/287 |
| 2009/0218817 A1* | 9/2009 | Cardinal et al. | 290/44 |
| 2009/0322079 A1* | 12/2009 | Letas | 290/44 |
| 2010/0094474 A1* | 4/2010 | Larsen et al. | 700/287 |
| 2011/0006528 A1* | 1/2011 | Engelhardt et al. | 290/44 |

OTHER PUBLICATIONS

Danish Patent and Trademark Office, Office Action issued in related Danish Patent Application No. PA200900781 dated Jan. 28, 2010.

* cited by examiner

CURRENT CONTROL OF A WIND PARK

CROSS-REFERENCE TO RELATED APPLICATIONS

This application claims priority under 35 U.S.C. §119(a) to DK Application No. PA 2009 00781, filed Jun. 24, 2009. This application also claims the benefit of U.S. Provisional Application No. 61/222,134, filed Jul. 1, 2009. Each of these applications is incorporated by reference herein in its entirety.

TECHNICAL FIELD

The present invention relates generally to current control in a wind park, and in particular, to a method for controlling current provided by a wind park during a grid irregularity.

BACKGROUND

Wind power plants or wind farms generally include many individual wind turbines. Power generated by the wind turbines forms the total power delivered by the wind farm to a utility system or grid. The wind farm usually delivers the generated power to the grid through a Point of Common Coupling (PCC).

When there is a fault in the grid, the wind farm is usually disconnected from the grid to protect its wind turbines from sudden surge of current which may damage the components of the turbines. When the fault is cleared, the wind farm, and hence the wind turbines, is re-connected to the grid again to supply power thereto.

With increasing penetration of wind power generation, the disconnecting of the wind farm from the grid is no longer acceptable by grid operators. This is because there is a possibility of voltage collapse in the recovery phase after the fault is cleared due to high reactive power consumption and loss of synchronism. Grid operators in many countries now require wind farm operators to comply with certain grid requirements specified in grid codes before they are allowed to connect to the grid. Grid requirements vary in different countries, but they have a common aim of permitting the development, maintenance and operation of a coordinated, reliable and economical transmission or distribution system.

Grid codes typically require that wind turbines should be able to ride-through a fault causing the voltage at PCC to decrease to, for example 0.2 pu with duration of 0.5 seconds. In addition, grid codes also typically require reactive current contribution from individual wind turbines and/or wind farms during such grid faults.

In order to comply with grid requirements, wind turbines usually have solutions which enable the turbines to control the generation of reactive power. Thus when there is a grid fault causing the grid voltage to fall, the wind turbines can increase their reactive current output. The total increase in the reactive current from the wind turbines can be injected into the grid through the PCC of the wind farm to stabilize the grid.

U.S. Pat. No. 6,924,565 discloses a network of variable speed wind turbine generator systems. Each generator is able to generate real power and reactive power, and includes a system controller coupled to the generators to control the real and reactive power generated by the generators based on thermal capability and/or voltage limits of the individual generators. Thus, the network of generator systems is able to provide commanded real and reactive power with a closed-loop voltage system. In this patent document, a voltage controller monitors the PCC between the wind turbine generator system and the utility grid. Based on measurements, reactive power commands are transmitted to the individual generators to generate the required reactive power for the wind turbine generator system. Thus, the system provides a closed loop control.

Thus, aspects in accordance with embodiments of the invention are directed to providing an improved solution to control the current provided at the PCC during a grid fault.

SUMMARY

According to a first aspect of the invention, a method for controlling a current in a wind park is provided. The wind park comprises at least one wind turbine and at least one current generator. The method comprises detecting a grid irregularity, determining an optimal current to be provided at a predetermined location in the wind park during the grid irregularity and determining a corresponding current to be generated from the at least one current generator so as to provide the optimal current at the predetermined location. The corresponding current is determined based on at least an impedance value between the at least one current generator and the predetermined location.

The detected grid irregularity refers to events at the grid which causes the grid to be unstable. Such events include a sudden dip or increase in the voltage level, change in phase or frequency of the power, etc. When such grid irregularity is detected, the wind park provides an optimal current at the predetermined location in the wind park. This optimal current at the predetermined location is subsequently injected into the grid to help stabilize the grid. The predetermined location is a location in the wind park seen by the grid. This location may be a point between a main wind park transformer and the grid, on a common power line between the wind turbines and the main wind park transformer, etc.

The optimal current is provided by the one or more current generators in the wind park. The combined current from the current generators may not always correspond to the optimal current required at the predetermined location. This is because there may be component(s) located between the current generators and the predetermined location. The component(s) may introduce impedance along the path from the current generators to the predetermined location, and hence, affecting the current provided at the predetermined location. In one embodiment, the impedance between the current generators and the predetermined location is taken into account when determining the corresponding current to be generated by the current generators. Thus, the current generated by the current generators would result in the desired optimal current at the predetermined location.

Advantageously, embodiments of the invention provide a method which allows a wind park manager to provide an optimal current to the utility system, and also for a utility system manager to obtain the required current, for stabilizing the grid in event of a grid irregularity. The optimal/required current is provided by the wind park without the need of any complicated feedback loops as mentioned in the prior art. Such a method is especially crucial for very weak grids when events, such as sudden voltage dip, occur in the grid. According to aspects of the invention, there is improved controllability during grid faults or when the grid is weak, thus fulfilling the requirements of grid codes of many countries.

According to an embodiment, the predetermined location includes a point of common coupling of the wind park to the grid or utility system. The point of common coupling (PCC) is a point which the wind park interfaces with the grid. The grid only sees the wind park as a whole, and not the individual wind turbines in the wind park. When grid codes require certain voltage or power parameters to be provided by the wind park, these parameters are usually required to be provided at the PCC of the wind park.

According to an embodiment, the grid irregularity includes a low voltage event. The low voltage event is a scenario when the grid voltage decreases suddenly and abruptly, for example to about 20% (or 0.2 pu) of its rated voltage in a few milliseconds. Usually, the grid voltage recovers in a few hundreds of milliseconds. Grid codes normally require that wind parks remain connected or "Ride-Through" the low voltage event. Additionally, the grid codes may require the wind park to supply some amount of current to help the grid to recover from the low voltage event, thus stabilizing it.

According to an embodiment, the optimal current is an optimal reactive current. The optimal reactive current follows a predetermined pattern of injected reactive current towards a voltage level during the grid irregularity. When there is a grid irregularity, a desired amount of reactive current is provided by the wind park at the predetermined location. Such an injected optimal reactive current is advantageous in maintaining the stability of the grid. The amount of reactive current to be provided or injected into the grid depends on the state of the grid irregularity. In one example, the predetermined pattern of injected reactive current is based on the pattern of injected reactive current based on grid code requirements. This pattern of injected reactive current based on grid code requirements is normally an increase in injected reactive current when there is a decrease in grid voltage. It should be noted that the predetermined pattern of injected reactive current may be self-defined. For example, it may be determined that a certain pattern of reactive current provided at the predetermined location is advantageous in stabilizing the utility system. Thus in another example, the predetermined pattern of injected reactive current is based on such a self-defined pattern of injected reactive current.

According to an embodiment, the current generator includes a reactive current generator for generating a reactive current, and an active current generator for generating an active current. Thus, the wind park is capable of providing either an optimal reactive current or an optimal active current, or a combination of both, at the predetermined location of the wind park. Depending on the type of grid irregularity, a suitable form of optimal current (active and/or reactive current) for stabilizing the utility system can be provided. Therefore, in this embodiment, a versatile method towards ensuring grid stability is provided.

According to an embodiment, the method includes controlling the active current generated by the active current generator so as to provide the optimal reactive current at the predetermined location. According to a further embodiment, the amount of active current to be generated in order to provide the optimal reactive current is determined using the following expression:

$$I_{ds\_opt} = \frac{R}{X}\left(I_{qs} \pm \frac{v_G K_G}{\sqrt{Z^2 + 4X^2(K_{wf}^2 - K_{wf})}}\right),$$

wherein
$I_{ds\_opt}$ is the active current generated by the active current generator,
$I_{qs}$ is the reactive current generated by the reactive current generator,
R is a resistance between the current generator and the predetermined location,
Z is the impedance between the current generator and the predetermined location,
X is a reactive impedance between the current generator and the predetermined location,
$v_G$ is the amplitude of the voltage at the grid, and
$K_G$ and $K_{wf}$ are grid constants.

According to an embodiment, the wind turbine in the wind park includes the active current generator and the reactive current generator. In this embodiment, the wind turbine generates both the active and reactive currents. The active and reactive currents may be generated by components in the wind turbine, for example, by a power or frequency converter. Such a power converter may be found in a variable speed wind turbine for converting a variable frequency power output from a generator of the wind turbine into a fixed frequency power output. The power output may be controlled by the power converter so that it has the determined active and/or reactive current component for providing the optimal current at the predetermined location.

According to an embodiment, the reactive current generator includes a Static Synchronous Compensator (STATCOM). In this embodiment, the reactive current is generated by the STATCOM. The STATCOM may be located in the wind turbine, beside the wind turbine, at a substation or at any other locations in the wind park. The active current in this embodiment may be generated by the wind turbine or by any other type of active current generator such as an energy storage unit.

According to an embodiment, the active current generator includes an energy storage unit for providing active current. Examples of an energy storage unit includes, but is not limited to, electrochemical cells (that is, batteries), capacitors, Uninterrupted Power Supplies (UPS), hydraulic accumulators, auxiliary generators, etc. Similarly, the energy storage unit may be located in the wind turbine, beside the wind turbine, at a substation or at any other locations in the wind park. In this embodiment, the reactive current may be generated by the wind turbine or the STATCOM.

In a second aspect of the invention, a wind park is provided. The wind park includes one or more wind turbines and a wind park controller. The wind park controller is adapted to perform the method described above. Specifically, the wind park controller is adapted to detect a grid irregularity, determine an optimal current to be provided at a predetermined location in the wind park during the grid irregularity and determine a corresponding current to be generated from a current generator so as to provide the optimal current at the predetermined location. The corresponding current is determined based on at least an impedance value between the current generator and the predetermined location.

It should be noted that a person skilled in the art would readily recognize that any feature described in combination with the first aspect of the invention could also be combined with the second aspect of the invention, and vice versa. The wind park according to the second aspect of the invention may advantageously be adapted to perform the method of the first aspect of the invention.

In a third aspect of the invention, a controller for use in a wind park comprising one or more wind turbines is provided. The controller is adapted to perform the method described in the first aspect of the invention. Specifically, the controller is adapted to detect a grid irregularity, determine an optimal current to be provided at a predetermined location in the wind park during the grid irregularity and determine a corresponding current to be generated from a current generator so as to provide the optimal current at the predetermined location.

The corresponding current is determined based on at least an impedance value between the current generator and the predetermined location.

In one embodiment, the controller is further adapted to calculate a current to be generated by each current generator in the wind park in order to provide the optimal current at the predetermined location. In an alternative embodiment, each current generator comprises a controller adapted to perform the method.

It should be noted that a person skilled in the art would readily recognize that any feature described in combination with the first aspect of the invention could also be combined with the third aspect of the invention, and vice versa.

According to a fourth aspect of the invention, a program for a processor is provided. The program, when loaded in the processor, carries out the method of the embodiments described above.

BRIEF DESCRIPTION OF THE DRAWINGS

The invention will be better understood with reference to the detailed description when considered in conjunction with the non-limiting examples and the accompanying drawings.

DETAILED DESCRIPTION

Figure 1:
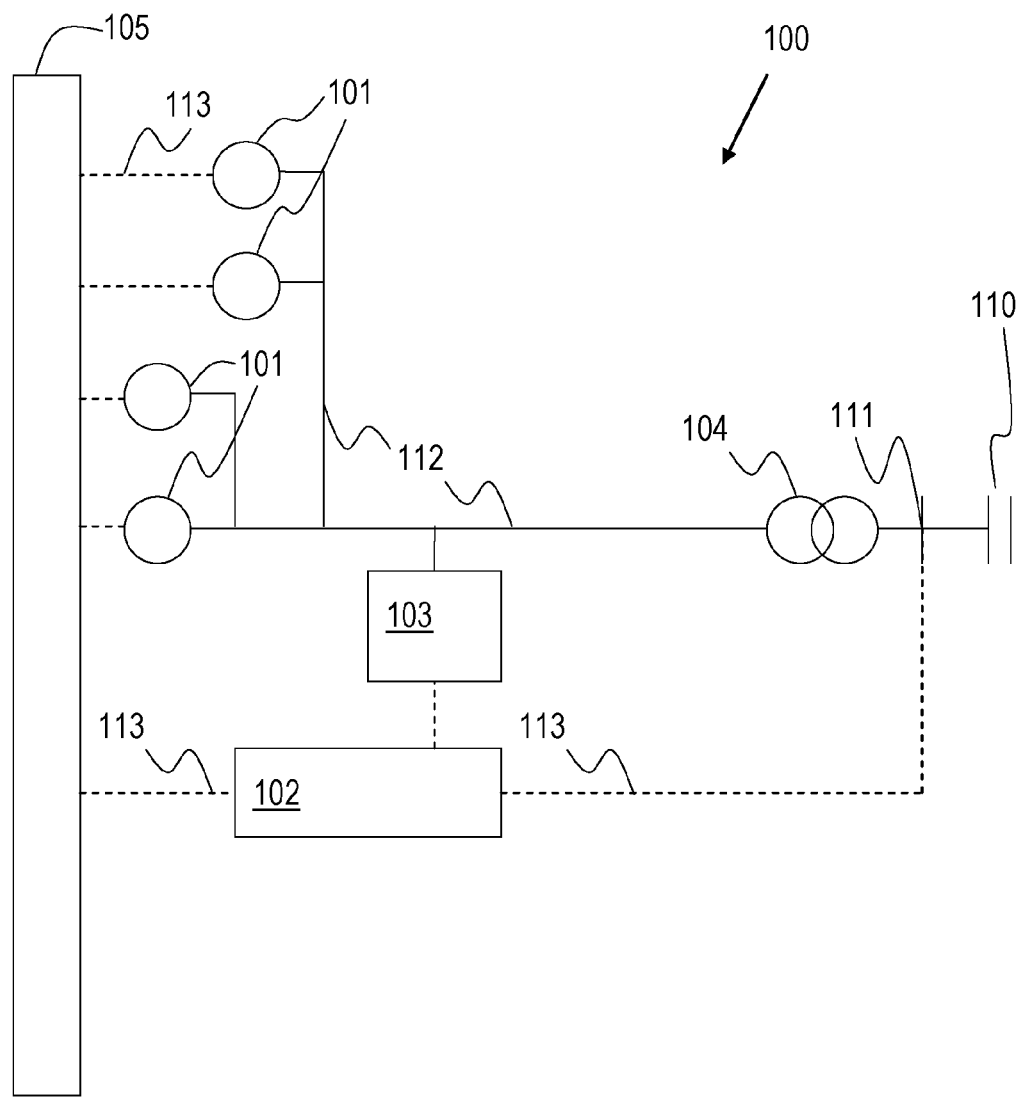
FIG. 1 shows a general layout of a wind park.

FIG. 1 shows a general layout of a wind park 100. The wind park 100 includes a plurality of wind turbines 101, a wind park controller 102, a compensation device 103, a wind park transformer 104 and a wind park network 105. The wind park 100 is connected to a utility system or grid 110 via power lines 112 and through the wind park transformer 104. The interface point between the wind park 100 and the utility system 110 is called the point of common coupling (PCC) 111.

Power produced by the wind turbines 101 are distributed over the power lines 112 and provided to grid 110 via the PCC 111. The compensation device 103 is a reactive power generation device used to compensate reactive power of the wind park 100. Examples of the compensation device 103 include but not limited to a thyristor switched capacitor bank and a static VAR compensator (SVC). The reactive power from the compensation device 103 is also delivered to the grid 110 over power lines 112. The wind park transformer 104 steps down the voltage from the wind park 100 into a lower voltage suitable for transmission in the grid 110.

The wind park controller 102 generally fulfils a plurality of control functions. For example, the power plant controller may collect different types of data which characterizes the current state of the wind turbines 101 or components thereof, and in response thereto control the operation of the wind turbines 101. The wind turbines 101 communicate with the controller 102 through the wind power plant network 105 using control lines 113 as shown as dotted lines in FIG. 1. The signals communicated between the controller 102 and the wind turbines 101 may include power output signal, turbine status, power reference, turbine command, etc. The controller 102 is also connected to the PCC 111 via control line 113. This allows the controller 102 to detect power parameters such as voltage and current levels at the PCC 111.

It should be noted that the layout of the wind park 100 shown in FIG. 1 is only an example, and the invention is not restricted to the exact layout of the wind park shown in FIG. 1. For example, although four (4) wind turbines 101 are shown in the wind park 100, it is possible that the wind park includes more or less than 4 wind turbines 101. It is also possible that the wind park only has one (1) wind turbine 101. Similarly, the wind park 101 may include more than one (1) compensation devices in other examples.

Figure 2A:
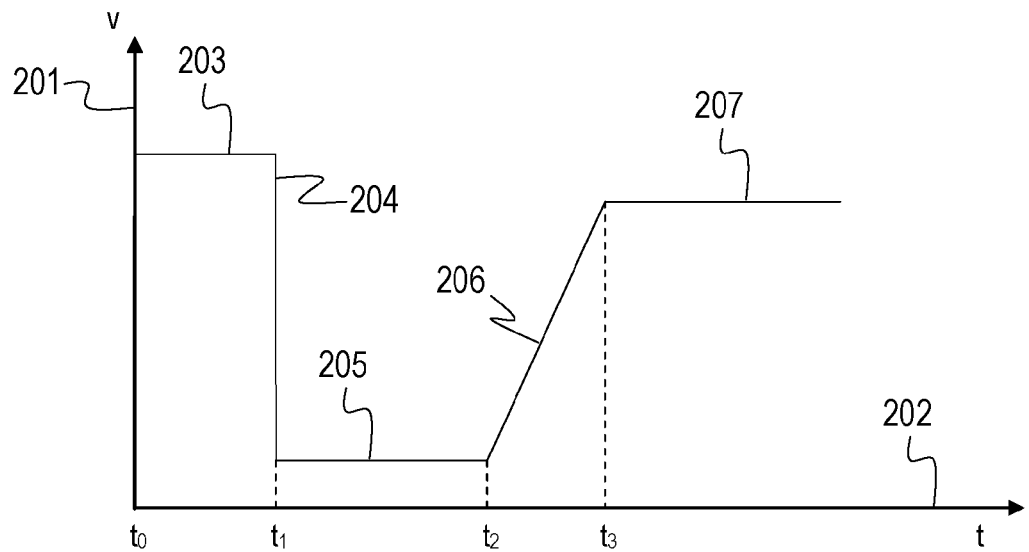
FIG. 2a is a graph illustrating a grid voltage level during a low voltage event.

FIG. 2a shows a graph illustrating a voltage level of the grid during a low voltage event. The vertical axis 201 shows the voltage level of the grid, and the horizontal axis 202 shows the time. Between $t_0$ and $t_1$, the grid is stable, and the grid voltage is relatively constant as illustrated by 203. At the occurrence of the low voltage event at $t_1$, the grid voltage drops abruptly and drastically as illustrated by 204. The grid voltage may drop to about 10% (or 0.1 pu) of its original value in less than one millisecond. The grid voltage stays at the low value for a few hundred of milliseconds as illustrated by 205. At $t_2$, the grid recovers and the grid voltage increases to about 80% of its original value in about 50-150 millisecond, as illustrated by 206. In order to maintain the stability of the grid, grid owners may specify in their grid codes that wind parks connected to the grid are required to inject certain amount of reactive current during a low voltage event. The amount of reactive current to be injected typically depends on the voltage level of the grid.

Figure 2B:
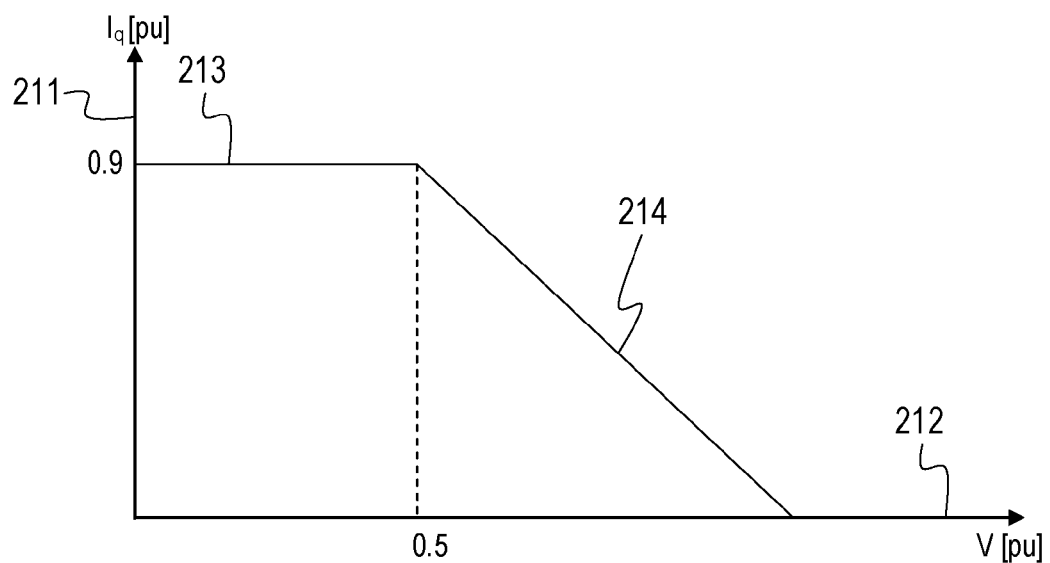
FIG. 2b is a graph illustrating the amount of reactive current required to be injected into a utility grid in response to the voltage level of the grid.

FIG. 2b shows a graph illustrating an example of the amount of reactive current required to be injected into the grid corresponding to the grid voltage level. The vertical axis 211 shows the required amount of reactive current to be injected, and the horizontal axis 212 shows the corresponding voltage level of the grid. When the grid voltage is less than 0.5 pu, the amount of reactive current is 0.9 pu as illustrated by 213. When the grid voltage increases from 0.5 pu, the amount of required reactive current decreases as shown by 214. When the grid voltage recovers to 0.85 pu, the amount of required reactive current to be injected into the grid is zero (0).

However, the amount of reactive current generated by the wind turbines 101 and/or the compensation device 103 may not result in a desired reactive current at the PCC 111. This is because there are components and cables between the wind turbines 101 and/or the compensation device 103, and the PCC 111. Such components and cables introduce impedance into the transmission path, resulting in the reactive current reaching the PCC 111 to be different from that which was sent from the wind turbines 101 and the compensation device 103.

According to an embodiment, when it is detected that there is a low voltage event at the grid 110 (measured at the PCC 111 or 101 WTG), the controller 102 determines an optimal reactive current to be provided at the PCC 111, that is, to be injected into the grid 110. The amount of reactive current to be injected into the grid 110 may be based on a pattern specified by grid owners, such as the pattern of FIG. 2b, or based on self-defined pattern. In addition, the controller 102 also determines a corresponding reactive and active current to be generated by the wind turbines 101 and/or the compensation device 103 in order to result in the optimal reactive current at the PCC 111. The active and reactive currents is determined taking into account any impedance between the wind turbines 101, the compensation device 103 and the PCC 111.

Figure 3A:
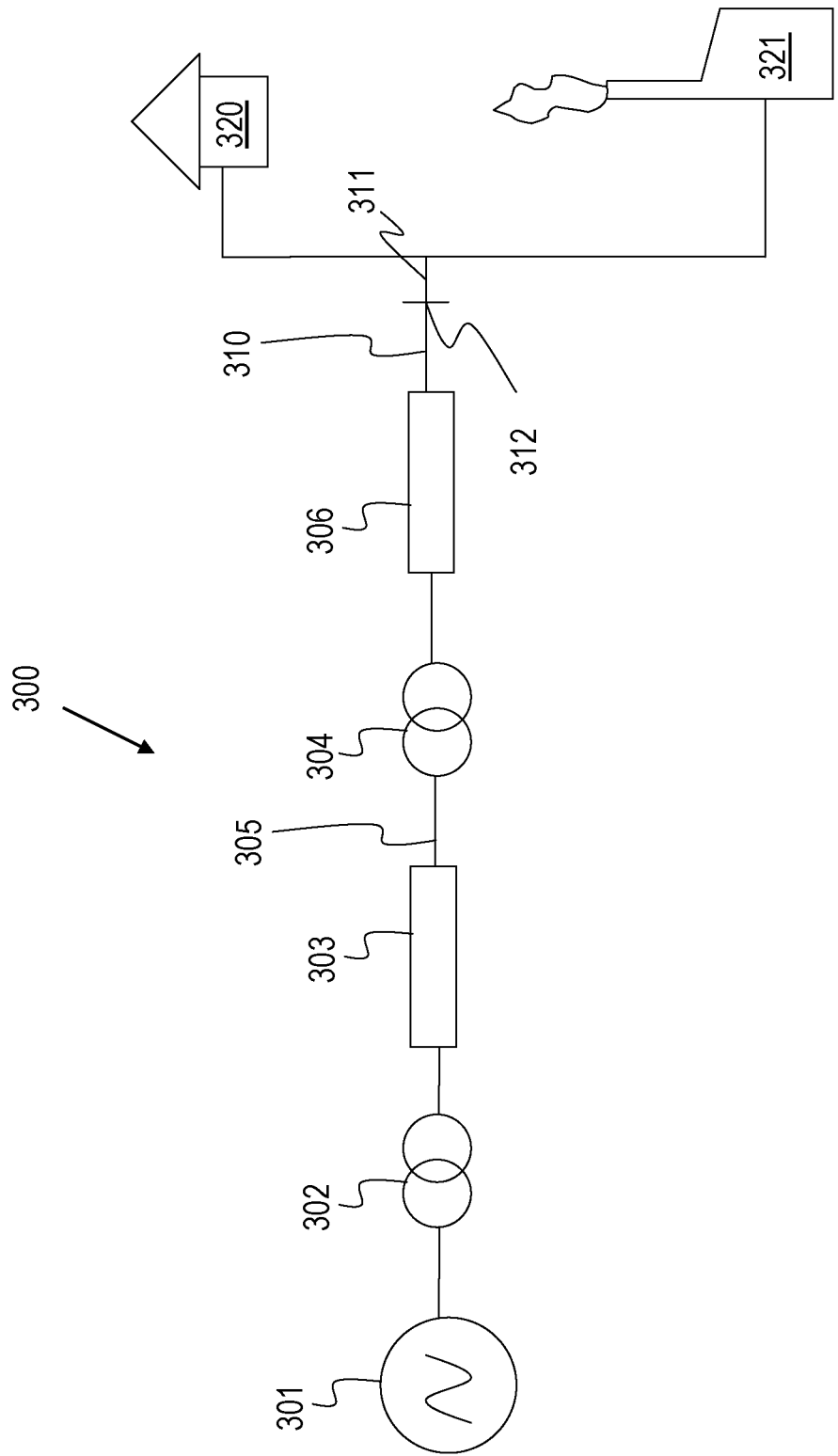
FIG. 3a illustrates a schematic layout of the wind park according to an embodiment.

FIG. 3*a* shows a schematic layout of the wind park 300 according to an embodiment. The schematic layout of FIG. 3 illustrates the impedances that are introduced into the wind park 300. For the sake of clarity, only one wind turbine 301 is illustrated in FIG. 3. It should be noted that the wind park 300 may include more than one wind turbines 301. Is it also assumed that both the reactive and active current are generated by the wind turbine 301. The wind turbine 301 is connected to a wind turbine transformer 302. The wind turbine transformer 302 is in turn connected to the wind park transformer 304 via power cables 305. The impedance of the power cables 305 is represented by the cable impedance 303. The wind park 300 is connected to a utility system or grid 311 using overhead lines (OVL) 310. The impedance of the OVL 310 is represented by the OVL impedance 306. The wind park 300 interfaces with the grid 311 through the PCC 312. The grid 311 supplies power to a load, for example, a household unit 320. Additional power plants, for example a conventional coal power plant 321, may also supply power to the grid 311. According to an embodiment, the cable impedance 303 and the OVL impedance 306 are taken into account when determining the active and reactive currents to be generated, so as to provide the optimal reactive current at the PCC 312.

Figure 3B:
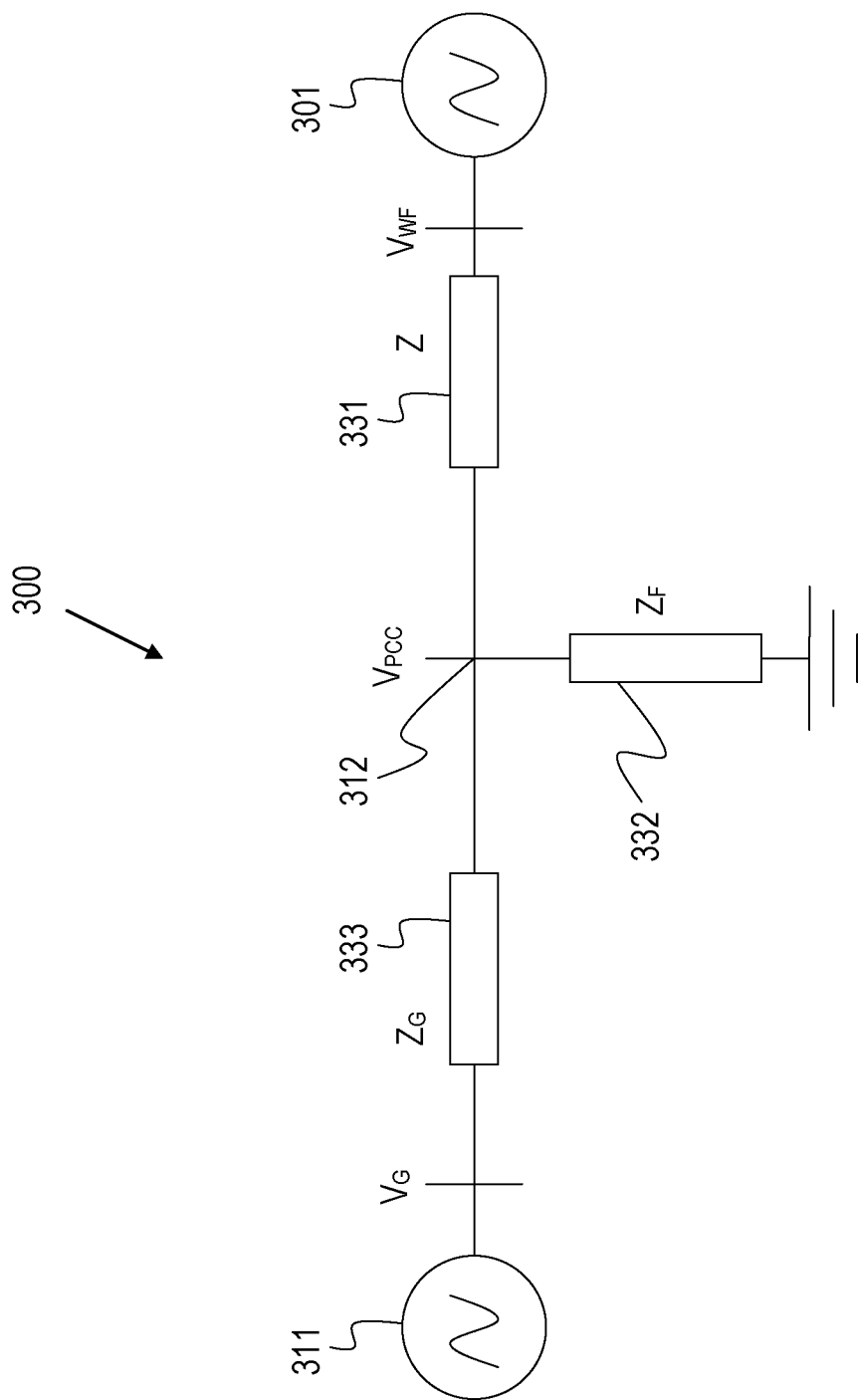
FIG. 3b illustrates a simplified schematic layout of the wind park of FIG. 3a according to an embodiment.

FIG. 3*a* may be further represented by the schematic diagram shown in FIG. 3*b*.

An example of determining an optimal active current to be generated by the wind turbine 301 in order to obtain the optimal reactive current at the PCC 312 will be illustrated with reference to FIG. 3*b*. In FIG. 3*b*, the impedance 331 between the wind turbine 301 and the PCC 312 is represented as Z. The impedance 332 from the PCC 312 to the grid fault is represented as $Z_F$. The impedance 333 from the PCC 312 to the grid 311 is represented as $Z_G$.

Assuming that the impedances Z, $Z_F$, $Z_G$ have the same angle (that is, the angle between the real and imaginary part is the same for each impedance):

$$\vec{V}_{PCC} = K_G \vec{V}_G + K_{wf} \vec{V}_{wf}$$

$$\vec{V}_{wf} = E_S(\cos(\alpha) + \sin(\alpha)j)$$

$$\vec{V}_G = v_G$$

wherein $v_G$ is the amplitude of the voltage at the grid 311,
$E_s$ is the amplitude of the voltage at the wind turbine 301,
$\alpha$ is the angle between vector $\vec{V}_{wf}$ and $\vec{V}_G$, $$K_G = \frac{Z_F Z}{Z_G Z + Z_F Z + Z_G Z_F} = \frac{K_2 K_1}{K_1 + K_1 K_2 + K_2},$$

and $$K_{wf} = \frac{Z_F Z_G}{Z_G Z + Z_F Z + Z_G Z_F} = \frac{K_2}{K_1 + K_1 K_2 + K_2}.$$

$K_1$ is related to the short circuit ratio between the PCC 312 and the grid, and $K_2$ is related to the distance of the fault to the PCC 312 (or the remaining voltage at the PCC 312). $K_1$ and $K_2$ can be obtained from the following expressions:

$$\vec{Z}_F = K_2 \vec{Z}_G,$$

$$\vec{Z} = K_1 \vec{Z}_G, \text{ and}$$

$$\vec{Z} = R + jX$$

The power delivered at the PCC 312 from the wind turbine 301 is:

$$\vec{S}_{PCC} = P_{CC} + Q_{PCC}j = \vec{V}_{PCC}\vec{I}^* = \vec{V}_{PCC}\left[\frac{\vec{V}_{wf} - \vec{V}_{PCC}}{Z}\right]^*,$$

wherein $\vec{V}_{PCC}$ is the voltage vector at the PCC 312, $\vec{I}$ is, the current vector flowing through the impedance 331, and $\vec{V}_{wf}$ is the voltage vector at the wind turbine 301.

$\vec{V}_{wf}$ can be represented using the following expression:

$$E_S = \frac{I_{qs}Z^2 + v_G K_G(R\sin(\alpha) + X\cos(\alpha))}{X(1 - K_{wf})},$$

wherein $I_{qs}$, is the current at the wind turbine 301.

The active current $I_d$ and reactive current $I_q$ at the PCC 312 are:

$$I_d = \frac{P_{CC}}{|\vec{V}_{PCC}|},$$

and $$I_q = \frac{Q_{PCC}}{|\vec{V}_{PCC}|}.$$

Using the above expressions, the active current $I_d$ and reactive current $I_q$ at PCC 312 are determined as:

$$I_d = -\frac{\begin{array}{c}-v_G K_G E_S(X\sin(\alpha) + R\cos(\alpha)) + \\ 2v_G K_G R E_S K_{wf}\cos(\alpha) + \\ v_G^2 K_G^2 R + E_S^2 K_{wf} R(K_{wf} - 1)\end{array}}{Z^2\sqrt{v_G^2 K_G^2 + 2v_G K_G K_{wf} E_S \cos(\alpha) + K_{wf}^2 E_S^2}},$$

and $$I_q = -\frac{\begin{array}{c}v_G K_G E_S(R\sin(\alpha) - X\cos(\alpha)) + \\ 2v_G K_G X E_S K_{wf}\cos(\alpha) + v_G^2 K_G^2 X + E_s^2 K_{wf} X(K_{wf} - 1)\end{array}}{Z^2\sqrt{v_G^2 K_G^2 + 2v_G K_{wf} E_S \cos(\alpha) + K_{wf}^2 E_S^2}}.$$

The angle $\alpha_{opt}$ which result in a maximum reactive current $I_q$ at the PCC 312 is determined as:

$$\alpha_{opt} = \arctan\left(\frac{R}{X(2K_{wf} - 1)}\right).$$

Using the determined angle $\alpha_{opt}$, the optimal active current $I_{ds\_opt}$ to be generated by the wind turbine 301 in order to result in the maximum reactive current $I_q$ at the PCC 312 is determined as:

$$I_{ds\_opt} = \frac{R}{X}\left(I_{qs} \pm \frac{v_G K_G}{\sqrt{Z^2 + 4X^2(K_{wf}^2 - K_{wf})}}\right).$$

It is noted that the second term in the above-mentioned expression for the optimal active current is negative when $2K_{wf} < 1$. This is the case when this method is used for low voltage events and $K_{wf}$ is proportional to the remaining voltage at the PCC 312. For very low voltage, the optimal active current $I_{ds\_opt}$ can be approximated for an easier control implementation as:

$$I_{ds\_opt} \approx \frac{R}{X}\left(I_{qs} - \frac{V_{PCC}}{Z}\right)$$

From the expressions derived in this example, it can be seen that the reactive current $I_q$ at the PCC 312 is substantially influenced by the voltage level at the PCC 312, the impedance between the wind turbine 301 and the PCC 312 and the active current $I_d$ at the wind turbine 301.

Figure 4:
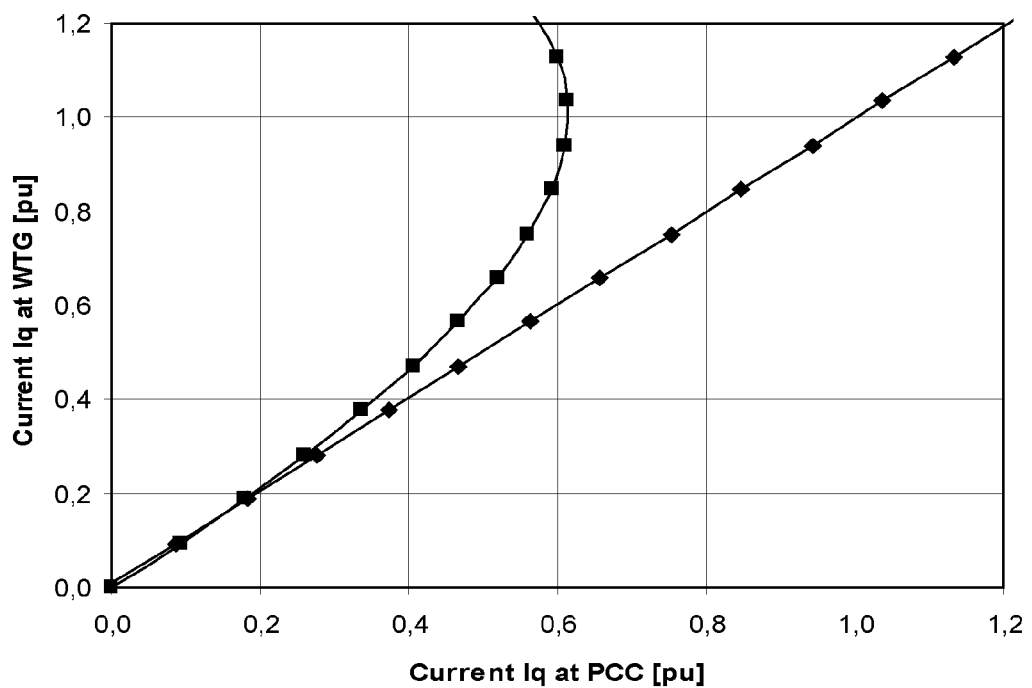
FIG. 4 illustrates the reactive current level at a point of common coupling of the wind park with and without active current control according to an embodiment.

FIG. 4 shows the value of the reactive current $I_d$ at the PCC 312 with and without active current control according to an embodiment. The vertical axis 401 of the graph in FIG. 4 is the reactive current value generated by the wind turbine, and the horizontal axis 402 is resulting reactive current value at the PCC 312. Curve 403 shows the value of the reactive current value at the PCC with respect to the reactive current generated by the wind turbine without any control of the active current generated by the wind turbine 301. Curve 404 shows the value of the reactive current value at the PCC with respect to the reactive current generated by the wind turbine when the active current generated by the wind turbine is controlled according to an embodiment. With active current control, it can be seen that the reactive current value at the PCC is maximized for any reactive current generated by the wind turbine.

The above embodiment described the generation of the active current and reactive current by the wind turbine. It should be noted that the active current and/or the reactive current may be generated by other components outside the wind turbines. For example, the reactive current may be generated from a STATCOM. The STATCOM may be located beside a wind turbine or at any other locations in a wind park. The active current may also be generated by an energy storage unit, such as a flow battery. The flow battery may be integrated into the wind turbine, or may be at any other locations in the wind park.

Figure 5:
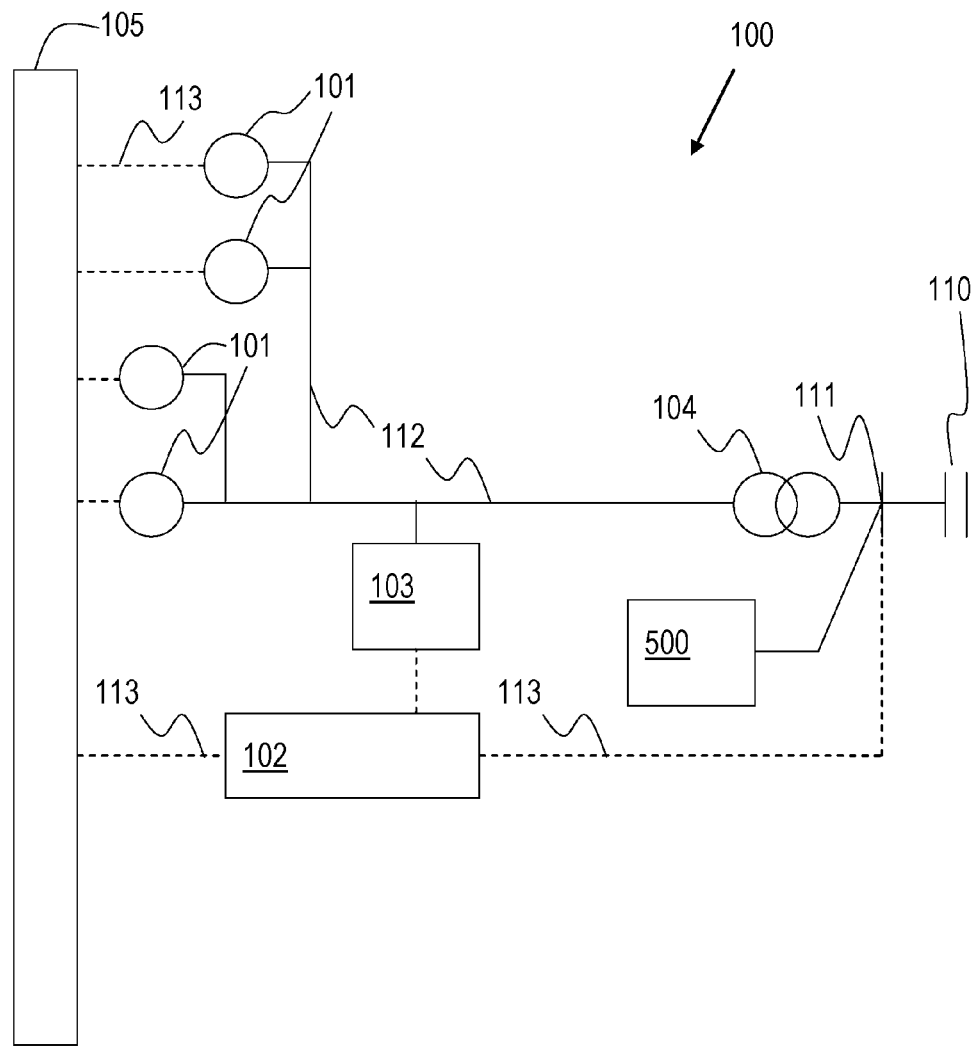
FIG. 5 illustrates a schematic layout of the wind park according to another embodiment.

FIG. 5 shows a layout of the wind park 100 of FIG. 1 where an energy storage unit 500 is used for generating active current to be provided at the PCC 111 of the wind park 100 according to an embodiment. The reactive current is generated by the compensation device 103, which may be a STATCOM. When a certain reactive current is desired to be provided at the PCC 111, the PPC 102 sends control signals to the STATCOM 103 to generate the corresponding reactive current and to the energy storage unit 500 to generate the corresponding active current. As described earlier, the generation of the active current is controlled in order to maximize the reactive current at the PCC 111. The corresponding amount of reactive current to be generated in order to result in the desired amount of reactive current at the PCC 111 may be determined based on FIG. 4. The generated active and reactive currents are provided to the power lines or collector system 112 so that they result in the desired reactive current at the PCC 111. All the other components of the wind park 100 have been described with reference to FIG. 1.

Figure 6:
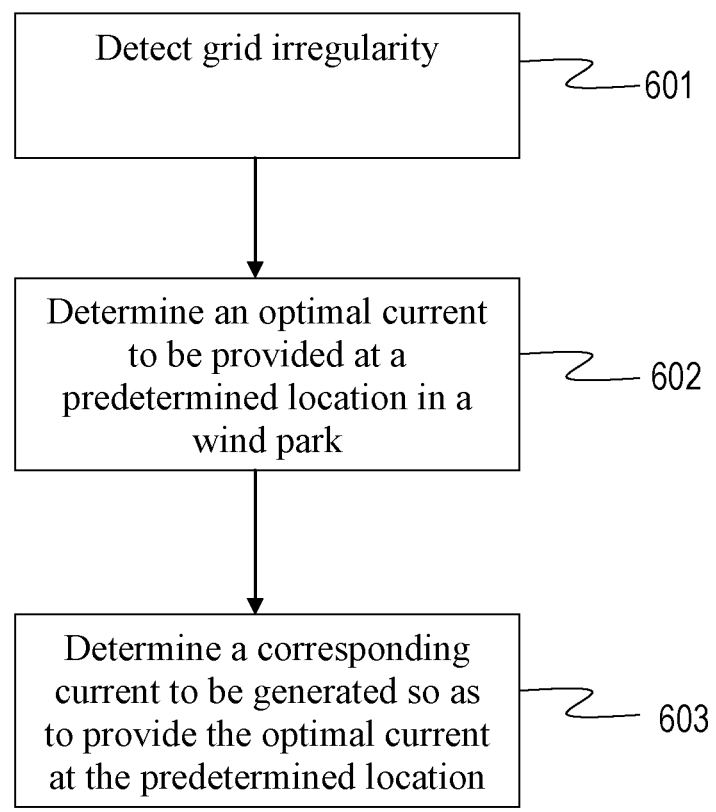
FIG. 6 shows a flow chart of a method for current control in the wind park according to an embodiment.

FIG. 6 shows a flow-chart of a method for controlling a current in a wind park according to an embodiment. Step 601 of the method includes detecting a grid irregularity. The grid irregularity may be detected at the PCC 111 by the wind park controller 102 (see FIG. 5). As described earlier, the grid irregularity to be detected may be a low voltage event.

Step 602 includes determining an optimal current to be provided at a predetermined location in a wind park. The optimal current may be a reactive current to be provided at the PCC 111 of the wind park 100. The value of the reactive current to be provided may be required by grid owner (specified in grid codes) or self-defined. Step 603 includes determining a corresponding current to be generated so as to provide the optimal current at the predetermined location of the wind park. The corresponding current to be generated may be an active current and a reactive current. As described earlier, the generated active current may be controlled so as to provide the optimal reactive current provided at the PCC 111. The active and reactive currents may be generated by the wind turbine 101. Alternatively, the active current is generated by the wind turbine 101 and reactive current is generated by the STATCOM 500.

It is apparent to a person skilled in the art that the embodiments described above can also be used to control the generation of a reactive current so as to provide a desired active current at the PCC 111. For example, if there a requirement to inject a certain amount of active current into the grid during a grid event, the wind park controller 102 may send control signals to the wind turbines 101, the compensation device 103 and/or the energy storage unit 500 to generate corresponding active and reactive currents so as to provide the desired active current at the PCC 111 according to an embodiment. Specifically, the generation of the corresponding reactive current is controlled in order to maximize the active current at the PCC 111.

The wind park controller 102 may include at least one processor coupled to a memory, which may represent the random access memory (RAM) devices constituting the main storage of the computer and any cache memories, non-volatile or backup memories (e.g., programmable or flash memories), read-only memories, etc. The wind park controller 102 may also include one or more mass storage devices. The wind park controller 102 also typically receives a number of inputs and outputs for communicating information externally. For interfacing with a user or operator, the wind park controller may include a graphical user interface with one or more input devices, such as a keyboard, a mouse, a trackball, a joystick, a touchpad, a keypad, a stylus, and/or a microphone, among others, as well a display, such as a CRT monitor, an LCD display panel, and/or a speaker, among others, or other type of output device, such as a printer. The interface to the wind park controller 102 may also be directed through an external terminal connected directly or remotely to controller 102, or through another computer communicating with controller 102 via a network or other type of recognized communications device.

The wind park controller 102 generally operates under the control of an operating system, and executes or otherwise relies upon various computer software applications, components, programs, objects, modules, data structures, etc., such as the control scheme or algorithm described herein and, in particular, the methods for current control in the wind park described herein. In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and mass storage devices in a computer, and that, when read and executed by one or more processors in a computer, causes that computer to perform the steps necessary to execute steps or elements embodying the various aspects of the embodiments of the invention.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A method for controlling a current in a wind park comprising at least one wind turbine, wherein the wind park comprises at least one current generator, the method comprising:
    detecting a grid irregularity;
    determining an optimal reactive current to be provided at a predetermined location in the wind park during the grid irregularity; and
    determining, using one or more processors associated with a wind turbine controller, a corresponding active current to be generated from the at least one current generator so as to provide the optimal reactive current at the predetermined location, characterized in that the corresponding active current is determined based on at least an impedance value between the current generator and the predetermined location.

2. The method according to claim 1, wherein the predetermined location comprises a point of common coupling of the wind park to a grid or utility system.

3. The method according to claim 1, wherein the grid irregularity comprises a low voltage event in the grid.

4. The method according to claim 1, wherein said optimal reactive current follows a predetermined pattern of injected reactive current towards a voltage level during the grid irregularity.

5. The method according to claim 1, wherein the at least one current generator comprises a reactive current generator for generating a reactive current and an active current generator for generating the active current.

6. The method according to claim 5, wherein the active current is determined based on the following expression:

$$I_{ds\_opt} = \frac{R}{X}\left(I_{qs} \pm \frac{v_G K_G}{\sqrt{Z^2 + 4X^2(K_{wf}^2 - K_{wf})}}\right),$$

wherein
 $I_{d\_opt}$ is the active current generated by the active current generator,
 $I_{qs}$ is the reactive current generated by the reactive current generator,
 R is a resistance between the wind turbine and the predetermined location
 Z is the impedance between the wind turbine and the predetermined location,
 X is a reactive impedance between the wind turbine and the predetermined location,
 $V_G$ is the amplitude of the voltage at the grid, and
 $K_G$ and $K_{wf}$ are grid constants.

7. The method according to claim 5, wherein the wind turbine comprises at least one of the active current generator and the reactive current generator.

8. The method according to claim 5, wherein the reactive current generator comprises a static synchronous compensator (STATCOM).

9. The method according to claim 5, wherein the active current generator comprises an energy storage unit.

10. A wind park comprising:
    at least one wind turbine; and
    a wind park controller adapted to do the following:
        detect a grid irregularity;
        determine an optimal reactive current to be provided at a predetermined location in the wind park during the grid irregularity; and
        determine a corresponding active current to be generated from a current generator so as to provide the optimal reactive current at the predetermined location, wherein the corresponding active current is determined based on at least an impedance value between the current generator and the predetermined location.

11. The wind park according to claim 10, wherein the predetermined location comprises a point of common coupling of the wind park to a grid or utility system.

12. The wind park according to claim 10, wherein the wind park controller is adapted to detect a low voltage event in the grid.

13. The wind park according to claim 10, wherein said optimal reactive current follows a predetermined pattern of injected reactive current towards a voltage level during the grid irregularity.

14. The wind park according to claim 10, wherein the current generator comprises a reactive current generator for generating a reactive current and an active current generator for generating the active current.

15. The wind park according to claim 14, wherein the wind turbine comprises at least one of the active current generator and the reactive current generator.

16. The wind park according to claim 14, further comprising a static synchronous compensator (STATCOM), wherein the STATCOM is the reactive current generator for generating the reactive current.

17. The wind park according to claim 14, further comprising an energy storage unit, wherein the energy storage unit is the active current generator for generating the active current.

18. A controller for use in a wind park comprising at least one wind turbine, the controller comprising one or more computer processors adapted to perform at least the following:
    detect a grid irregularity;
    determine an optimal reactive current to be provided at a predetermined location in the wind park during the grid irregularity; and
    determine a corresponding active current to be generated from a current generator so as to provide the optimal reactive current at the predetermined location, wherein the corresponding active current is determined based on at least an impedance value between the current generator and the predetermined location.

* * * * *